UNITED STATES PATENT OFFICE 2,560,424

TITANIUM TETRACHLORIDE TREATMENT PROCESS

Helmut Espenschied, Metuchen, N. J., assignor to National Lead Company, New York, N. Y., a corporation of New Jersey No Drawing. Application June 2, 1949,
Serial No. 96,825

3 Claims. (Cl. 202—57)

This invention relates to the purification of titanium tetrachloride, more specifically it relates to a convenient and economical process for purifying "crude" or "commercial grade" titanium tetrachloride to obtain a substantially water-white product.

Titanium tetrachloride usually is prepared commercially from ilmenite or rutile ores by chlorination processes and invariably the product is contaminated with various impurities which are carried over during the chlorination of the titanium values. The commercial product usually has a deep yellow color which is due to the presence of colored impurities in the titanium tetrachloride. Almost invariably crude titanium tetrachloride contains vanadium which is one of the most difficult of the impurities to remove. These colored impurities must be removed before the crude titanium tetrachloride may be used in processes demanding high purity, such as in the manufacture of titanium pigments and titanium metal.

An object of this invention, therefore, is to provide an improved method for the purification of crude titanium tetrachloride. A further object is to purify titanium tetrachloride in a convenient and economical manner. Another object is to remove the colored impurities from the crude titanium tetrachloride to obtain a substantially water-white product. These and other objects will become apparent from the following more complete description of this invention.

This invention in its broadest aspects contemplates a method for purifying crude titanium tetrachloride by contacting at elevated temperatures the crude titanium tetrachloride simultaneously with aluminum metal and aluminum chloride, and separating, preferably by distillation, the purified product.

The treating agents employed (aluminum metal and aluminum chloride) must contact the titanium tetrachloride simultaneously in order to obtain the desired effect. When the treating agents are separately or singly employed, the crude titanium tetrachloride remains in its impure state with substantially no effect on the impurities present.

It is preferred to add the aluminum metal in powdered form in order to obtain the maximum surface area of contact but aluminum turnings or strips may be employed. The aluminum chloride should be employed in the form of its anhydrous salt since the presence of water in the purification process will result in the formation of undesirable oxychlorides.

The quantity of treating agents used is directly dependent upon the type of starting material employed. Crude titanium tetrachloride often contains from about 0.002% to about 0.01% vanadium. With this type of starting material, from about 0.1% to about 1.0% aluminum metal plus about 0.05% to about 0.5% aluminum chloride will effectively purify the crude titanium tetrachloride to obtain a substantially water-white product. With greater amounts of vanadium present in the crude titanium tetrachloride, it may be advantageous to increase somewhat the amount of treating agents to obtain a substantially pure product; in some cases, up to about 10.0% aluminum metal and about 5.0% aluminum chloride may be required.

According to a preferred embodiment of this invention, the crude titanium tetrachloride is contacted simultaneously with small amounts of aluminum metal and anhydrous aluminum chloride. The tetrachloride, during or after treatment is heated to boiling and distilled to obtain a purified product. By this process, the original colored crude titanium tetrachloride is converted to a substantially water-white product having purity of a degree required for processes demanding high purity.

Although it is not essential, it is preferred to reflux the treated titanium tetrachloride for a period from 10 minutes to 2 hours before subsequently distilling the purified product. The refluxing period provides an extended contact period between the addition of the treating agents and the subsequent distillation of the product to insure efficient purification.

The following example is presented to illustrate a preferred embodiment of this invention:

1000 grams of crude titanium tetrachloride, containing 0.01% vanadium and other impurities, were placed in a glass distilling flask equipped with a reflux condenser. 1.0 gram of aluminum metal powder and 0.5 gram of anhydrous aluminum chloride were added to the titanium tetrachloride. The mixture was heated rapidly to boiling and refluxed for one hour under normal pressure. The treated titanium tetrachloride was then distilled in glass apparatus out of contact with the outside atmosphere and a purified substantially water-white product was obtained. The vanadium content in the purified product was <0.0008% vanadium.

Hence it is evident from the description of the present invention that the unusable crude titanium tetrachloride may be purified by the present process to obtain a water white purified product which is acceptable in processes demanding high purity. It is further evident that the process of this invention is convenient and economical because the treating agents employed are easily handled, inexpensive, and are added in small quantities.

While I have described and illustrated this invention by the example shown, it is not intended to be strictly limited thereto and other modifications and variations may be employed within the limits of the following claims:

I claim:

1. Method for the purification of a vanadium-containing crude titanium tetrachloride which comprises contacting at elevated temperature said titanium tetrachloride simultaneously with aluminum metal and anhydrous aluminum chloride and separating by distillation the purified product.

2. Method according to claim 1 in which the amount of aluminum metal added is from 0.1% to 1.0% and the amount of anhydrous aluminum chloride added is from 0.05% to 0.5%.

3. Method for the purification of a vanadium-containing crude titanium tetrachloride which comprises contacting said titanium tetrachloride simultaneously with aluminum metal and anhydrous aluminum chloride at boiling temperature and refluxing the same, and subsequently separating by distillation the purified product.

HELMUT ESPENSCHIED.

REFERENCES CITED

The following references are of record in the file of this patent:

UNITED STATES PATENTS

| Number | Name | Date |
|---|---|---|
| 2,457,917 | Nicholson | Jan. 4, 1939 |

OTHER REFERENCES

"Handbook of Chemistry and Physics," 28th E., pp. 450-451, 700-701. Published by Chemical Rubber Publishing Co., Cleveland, Ohio. (Copy in Division 59.)